United States Patent Office 3,014,077
Patented Dec. 19, 1961

3,014,077
PROCESS FOR REMOVAL OF VOLATILE, E.G. MALODOROUS FOREIGN MATTER FROM VISCOUS LIQUIDS
Peter Gassen, Koln-Buchforst, and Hans Holtschmidt and Heinrich Kunze, Koln-Stammheim, and Günther Braun, Leverkusen, Germany, assignors to Farbenfabriken Bayer Aktiengesellschaft, Leverkusen, Germany, a corporation of Germany
No Drawing. Filed Feb. 20, 1959, Ser. No. 794,513
Claims priority, application Germany Mar. 29, 1958
4 Claims. (Cl. 260—609)

The invention relates to a process for removal of volatile, e.g. malodorous matter from highly boiling viscous liquids, e.g. for deodorisation of polythioethers.

The diffusion resistance within high boiling viscous liquids is in most cases the determining factor for the rate at which the material passes over from the liquid into the surrounding carrier medium. For this reason volatile foreign matter can, in general be rapidly and economically removed only when short diffusion paths in the liquid and large surfaces are provided. A known method for removing volatile admixtures from viscous liquids is, e.g., the steam distillation in packed columns or bubble tray columns or in bubble columns. The disadvantage of these arrangements consists in that the thickness of the viscous liquid layers is relatively large and the exchange path in certain conditions very long. In many cases it is, therefore, not possible to attain the desired effect of purification with permissible technical expenditure.

These disadvantages can be overcome according to the invention by dividing the viscous liquid into fine droplets after adequate heating and thus bringing it into intimate contact with the vapour or gas (e.g. steam) effecting the purification. It has been found that by this method the desired effect is achieved already after a brief stay of the droplets in the gas or steam since the volatile constituents are transferred to the gaseous or vaporous purifying agent.

The vaporous purifying agent is preferably used directly as propellant for the spraying which is carried out with the aid of nozzles of known construction. For improving the purifying effect and avoiding high temperatures spraying can also be effected under vacuum. It is, moreover, possible to arrange several spraying installations in series if the desired purity is not attained by one passage. For separating the droplets of the liquid which may be carried over with the purifying agent, conventional separators such as cyclones, baffle plates etc. can be used. Purifying agent absorbed by the liquid can be recovered in a subsequent evaporator, e.g. thin layer evaporators or direct current evaporators.

The invention is illustrated by the following examples without being restricted thereto.

Example 1

Polythioether (producible according to German patent specification No. 1,005,275, by thermal condensation of $\beta\beta$-dioxy-diethyl sulphide with triethylene glycol or other glycols), a liquid having the viscosity of a thickly liquid oil, was preheated to 80–90° C. for removing odorous matter and sprayed by high-pressure steam of 4.5 atm. into a vessel evacuated to 100 mm. Hg. After 4 passages, the product was odourless.

Example 2

Another polythioether (as in Example 1) solid at room temperature was sprayed after melting and heating to 80–90° C. by steam of 4.5 atm. in the same arrangement at a pressure of 100 mm. Hg. The product had the required degree of purity already after one passage.

We claim:
1. Process for the removal of volatile malodorous matter from high boiling viscous polythioethers which comprises spraying such polythioether into individual droplets in the presence of steam as the propellant medium, intimately contacting said droplets and said steam to effect absorption of the volatile malodorous matter by said steam, and recovering the contacted droplets separately from said steam.
2. Process according to claim 1 wherein spraying is carried out in a vacuum.
3. Process according to claim 1 wherein the removal is carried out in several steps in series.
4. Process according to claim 1 wherein the steam is employed under high pressure.

References Cited in the file of this patent

UNITED STATES PATENTS

| | | |
|---|---|---|
| 235,521 | Fox | Dec. 14, 1880 |
| 294,285 | Stelzner | Feb. 26, 1884 |
| 704,989 | Vorce | July 15, 1902 |
| 1,439,685 | Bodman | Dec. 26, 1922 |
| 1,678,819 | Koch | July 31, 1928 |
| 2,451,668 | Egger et al. | Oct. 19, 1948 |
| 2,494,610 | Davidson et al. | Jan. 17, 1950 |
| 2,611,741 | Thompson | Sept. 23, 1952 |
| 2,689,871 | Rathmell et al. | Sept. 21, 1954 |
| 2,702,268 | Egger et al. | Feb. 15, 1955 |
| 2,731,081 | Mayner | Jan. 17, 1956 |
| 2,759,883 | Thurman | Aug. 21, 1956 |